United States Patent [19]
Hoffman et al.

[11] Patent Number: 5,374,222
[45] Date of Patent: Dec. 20, 1994

[54] BELT ARRANGEMENT

[75] Inventors: James R. Hoffman, Cincinnati; James H. Patterson, Wilmington, both of Ohio

[73] Assignee: Cincinnati Milacron Inc., Cincinnati, Ohio

[21] Appl. No.: 200,596

[22] Filed: Feb. 23, 1994

[51] Int. Cl.$^5$ .............................................. F16H 7/24
[52] U.S. Cl. ...................................... 474/150; 474/237
[58] Field of Search .................. 474/8, 148, 150, 151, 474/237, 253, 255

[56]  References Cited
U.S. PATENT DOCUMENTS

| | | | |
|---|---|---|---|
| 3,583,108 | 6/1971 | Oishi et al. | 51/237 |
| 4,730,448 | 3/1988 | Wolf et al. | 474/237 X |

OTHER PUBLICATIONS

Power Transmission Design, Guide to Power Transmission Products, pp. A151–A155 (Jan. 1993).
Machine Design, Basics of Design Engineering, pp. 111–114, (Jun. 1993).
Power Transmission Design, pp. 18, 57 (Apr. 1990).

*Primary Examiner*—Roger J. Schoeppel
*Attorney, Agent, or Firm*—Thomas M. Farrell

[57] ABSTRACT

Spaced headstock shafts are supported in common headstock walls such that their ends are inaccessible. The shafts are connected by an active timing belt. A spare timing belt is assembled around, but held out of contact with the shafts. At replacement time, the worn active belt is cut and removed and the spare belt is axially moved into its place. The drive may also include a belt tensioner.

6 Claims, 1 Drawing Sheet

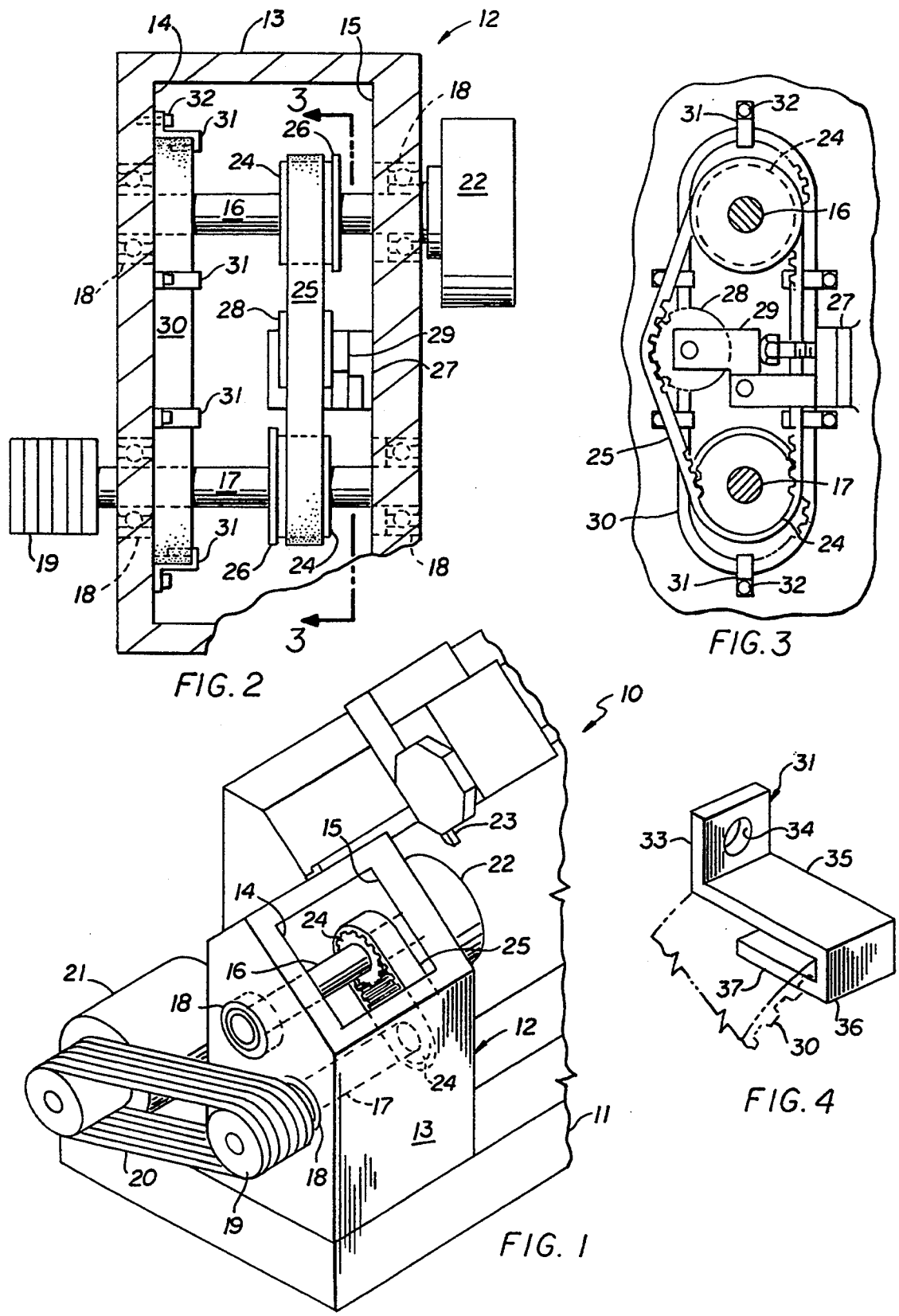

BELT ARRANGEMENT

FIELD OF THE INVENTION

The invention relates generally to machine drives employing endless drive belts, particularly those located within machine tool housings where the ends of interconnected shafts are relatively inaccessible.

BACKGROUND OF THE INVENTION

While the invention relates broadly to the connection of parallel shafts at the interior of a machine housing by means of an endless drive belt, it is of special value in connection with the headstock drive system for a turning center or lathe. Most lathes have an input shaft for a headstock motor drive, coupled to a system of change gears and shafts at the interior of the lathe headstock for transmitting power to the headstock spindle, which comprises an output shaft. The headstock spindle is used for supporting and driving a workpiece of revolution during machining operations. The headstock shafts of a lathe are frequently very heavy and are fixedly mounted at both ends into precision bearings located within the headstock housing. Due to the weight and complexity of mounting, disassembly of the shafts is very time consuming and quite laborious.

In a production turning machine, where frequent geared speed changes are not required, it is known to connect the input, or driving shaft, to the spindle, or driven shaft by means an endless belt; for example, a timing belt. Timing belts are very reliable and give good service, but when it is necessary to replace the endless timing belt, the disassembly of the driving and driven shafts is a cumbersome and time consuming task which necessitates a long, expensive downtime for the machine.

The present invention obviates the difficulties inherent in the prior machine assemblies.

SUMMARY OF THE INVENTION

It is an object of the present invention to provide an improved belt arrangement apparatus for use within a machine housing, for example, the headstock housing of a lathe, wherein an endless drive belt may be replaced by a spare endless drive belt without disassembling the interconnected shafts.

The invention is shown embodied in a machine tool, having a housing supporting a driving shaft and a driven shaft such that respective shaft ends are inaccessible, the shafts being spaced from one another and drivingly coupled at a first axial position by an active endless drive belt, wherein an improved belt arrangement apparatus comprises: a spare endless belt extending around the shafts but out of contact therewith; and means attached to the housing for supporting the spare endless belt in a second axial position out of contact with the shaft, and for restraining the spare endless belt against movement from the second axial position.

In connection with the above-described apparatus, the invention further contemplates a method for utilizing timing belts within a machine housing, comprising the following steps: rotatably supporting at least two spaced, parallel shafts in the spaced walls of the housing; drivingly connecting the shafts at a first axial position, between the walls, with a first endless drive belt extending around, and contacting the shafts; permitting a second endless drive belt to extend around the shafts, out of contact therewith, at a second axial position; supporting the second endless drive belts in the second axial position along the shafts, and restraining the second endless drive belt in the second axial position within respect to the housing walls; severing the first endless drive belt at a predetermined time and removing it from the housing; and unrestraining the second endless drive belt axially moving it along the shaft substantially to the first axial position, and drivingly connecting the shafts with the second endless drive belt.

BRIEF DESCRIPTION OF THE DRAWINGS

FIG. 1 is a perspective view of the headstock end of a lathe.

FIG. 2 is a sectional view through the headstock of FIG. 1, depicting input and output shafts interconnected by a drive belt.

FIG. 3 is a cross-section through the drive shafts, taken along the line 3—3 of FIG. 2.

FIG. 4 is a perspective view of a belt support bracket.

DESCRIPTION OF THE INVENTION

Referring to the drawings, FIG. 1 depicts the headstock end of a turning machine 10, where the machine 10 has a base 11 supporting a headstock 12. Certain details of construction have been omitted for the sake of clarity, e.g., screws, keys, etc., as such details are deemed to be well within the ken of a machine tool designer. The headstock 12 comprises a generally box-shaped hollow housing 13, having spaced end walls 14, 15 in which a pair of heavy shafts 16, 17 are rotatably supported by antifriction bearings 18 (see also FIG. 2). The first shaft 16 is an input or driving shaft, having an outboard end fitted with a V-belt pulley 19, drivingly connected by a plurality of V-belts 20 to a drive motor 21 also supported on the machine base 11. The second shaft 17 is an output or driven shaft, which comprises the spindle of the turning machine 10. The spindle carries a chuck 22 or other means at its outboard end, for supporting and driving a workpiece of revolution (not shown); the supported workpiece is machined by a movable tool 23 supported on the machine base 11.

At the interior of the housing 13, the two shafts 16, 17 each have a timing belt pulley 24, interconnected by an endless active belt 25 at a first axial position measured along the shafts 16, 17. Here it may be noted that, while the preferred embodiment depicts a timing belt, other belts may be substituted therefor in accordance with the teachings of the invention; for example, V-belts or flat belts may also be used.

With reference now to FIGS. 2 and 3, the two shafts 16, 17 are shown interconnected by the endless active belt 25 extending around the respective pulleys 24. The pulleys 24 each have a small flange 26, the flanges 26 being oppositely disposed to one another and well-known in the art, to prevent the belt 25 from walking off one side or the other. It should be noted that the headstock 12 is also fitted with a belt tensioner 27, which comprises an idler pulley 28 rotatably mounted to an adjustable bracket 29 suitable for removing slack from the belt of fixed-center drive shafts in a manner well-known in the art. The tensioner 27 is of lighter weight construction than that of the shafts 16, 17, and may be easily disassembled and reassembled, or re-adjusted, when changing belts. Other types of tensioners may likewise be employed, and the tensioner 27 may be omitted without departing from the scope of this invention.

The ends of the shafts 16, 17 are relatively inaccessible for belt maintenance since they are axially fixed with the bearings 18 located the end walls 14,15 of the housing 13.

A endless spare belt 30 is positioned around the two shafts 16, 17 at assembly, as is the endless active belt 25, but the spare belt 30 is held axially in a second position, against the left end wall 14 by a plurality of brackets 31. The brackets 31, each secured by a screw 32, serve to support the spare belt 30 from falling against the shafts 16, 17, and to restrain the spare belt 30 from moving axially from its wall position, toward the first position occupied by the active belt 25. At such time when the active belt 25 is to be replaced, the active belt 25 is simply severed and removed from the assembly, and the spare belt 30 is released from its supported position by unfastening the brackets 31 from the left end wall 14. The spare belt 30 is then moved axially to the first position and trained around the pulleys 24.

An exemplary belt bracket 31 is shown in FIG. 4 as a piece of formed sheet metal, of uniform width and thickness. In the bracket 31, a flat tab 33 is formed with a hole 34 for receiving the screw 32 used in fastening the bracket 31 to the wall 14, and a flat beam portion 735 extends at 90° to the tab 33 for substantially the width of the belt A restraining portion 36 is formed at the end of the beam portion 35 to restrain the belt 30 from movement away from the end wall 14 and, finally, a support portion 37 is turned under from the restraining portion 36, for supporting and holding the belt 30 away from the shafts 16, 17. Here it may be noted that a variety of brackets might be employed for the purpose of supporting and restraining the spare belt 30, depending upon the headstock surfaces available for fastening the bracket. Further, it is not necessary that the second axial position of the spare belt 30 be located fully against the left end wall 14; the spare belt 30 may be spaced only a short clearance distance from the drive pulleys 24.

While the invention has been shown in connection with a preferred embodiment, it is not intended that the invention be so limited. Rather, the invention relates to all such designs and modifications as come within the scope of the appended claims.

We claim:

1. In a machine tool, having a housing supporting at least a driving shaft and a driven shaft such that respective shaft ends are inaccessible, the shafts being spaced from one another and drivingly coupled at a first axial position by an endless active belt, an improved belt arrangement apparatus, comprising:
    an endless spare belt extending around said shafts but out of contact therewith; and
    means attached to said housing for supporting said endless spare belt in a second axial position out of contact with said shafts, and for restraining the endless spare belt against movement from said second axial position.

2. The apparatus of claim 1, wherein said endless active and spare belts are timing belts.

3. The apparatus of claim 1, wherein said supporting and retaining means comprises a plurality of brackets fastened to said housing, at said second axial position along the length of said endless spare belt.

4. The apparatus of claim 3, wherein said endless active and spare belts are timing belts.

5. In a turning machine, having a headstock housing supporting at least a motor-driven input shaft and a headstock spindle, the shaft and spindle being parallel to one another and drivingly coupled by an active timing belt, and improved belt arrangement apparatus, comprising:
    a spare timing belt extending around said shaft and spindle but out of contact therewith; and
    a plurality of brackets attached to said headstock housing along the length of said spare timing belt, said brackets having a belt supporting portion and a belt restraining portion.

6. A method for utilizing timing belts within a machine tool housing, comprising the following steps:
    rotatably supporting at least two spaced, parallel shafts in spaced walls of said housing;
    drivingly connecting said shafts at a first axial position, between said walls, with a first endless drive belt extending around, and contacting said shafts;
    permitting a second endless drive belt to extend around said shafts, out of contact therewith, at a second axial position;
    supporting said second endless drive belt in said second axial position along said shafts, and restraining said second endless drive belt in said second axial position with respect to said housing walls;
    severing said first endless drive belt at a predetermined time and removing it from said housing; and
    unrestraining said second endless drive belt, axially moving it along said shafts substantially to said first axial position, and drivingly connecting said shafts with said second endless drive belt.

* * * * *